Feb. 7, 1939.  E. J. DONDLINGER  2,146,567
TRAILER TRANSPORT VEHICLE
Filed July 11, 1935  5 Sheets-Sheet 1
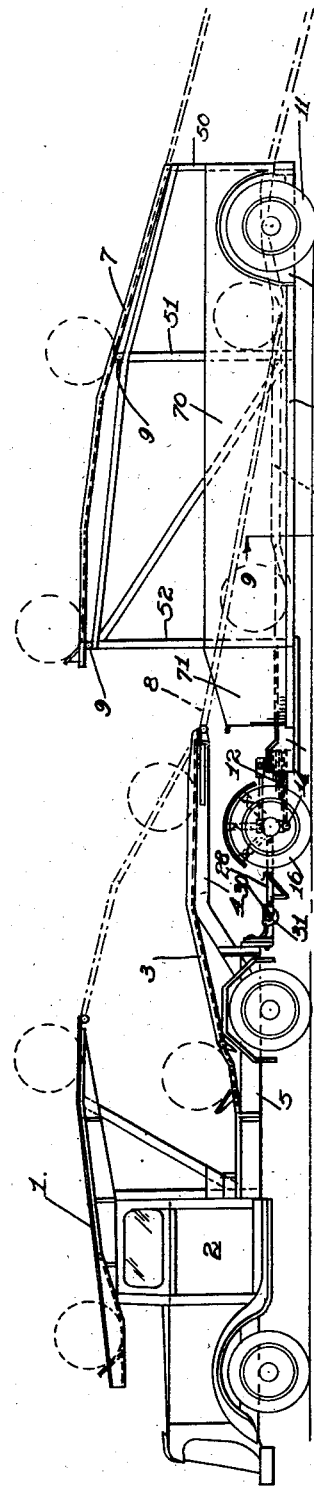
Inventor.
Eugene J. Dondlinger.
by
his Attorneys.

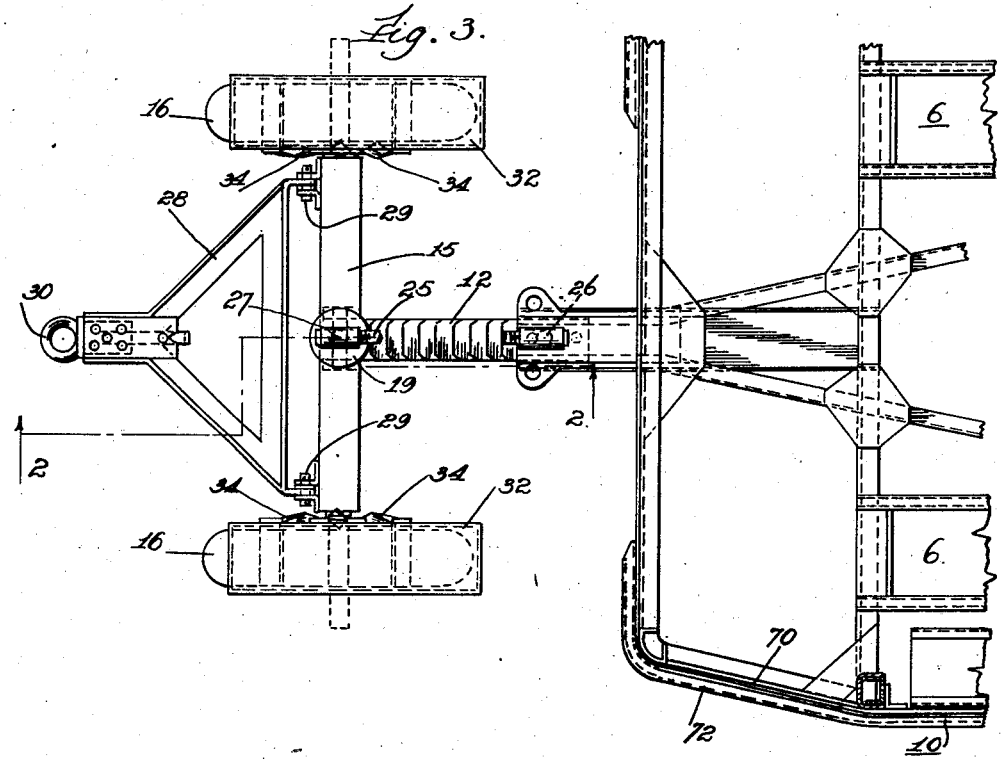
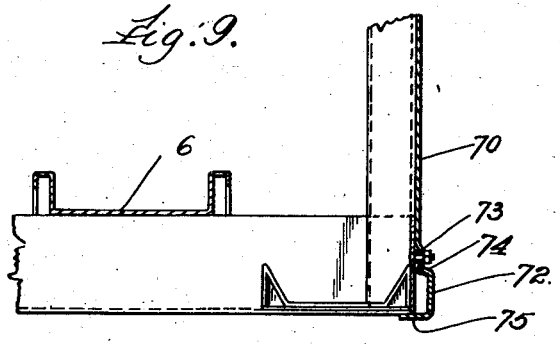

Feb. 7, 1939.   E. J. DONDLINGER   2,146,567
TRAILER TRANSPORT VEHICLE
Filed July 11, 1935   5 Sheets-Sheet 3

Witness.
J. O. McKnight.

Inventor.
Eugene J. Dondlinger
by his Attorneys.

Feb. 7, 1939.　　　E. J. DONDLINGER　　　2,146,567
TRAILER TRANSPORT VEHICLE
Filed July 11, 1935　　　5 Sheets-Sheet 4
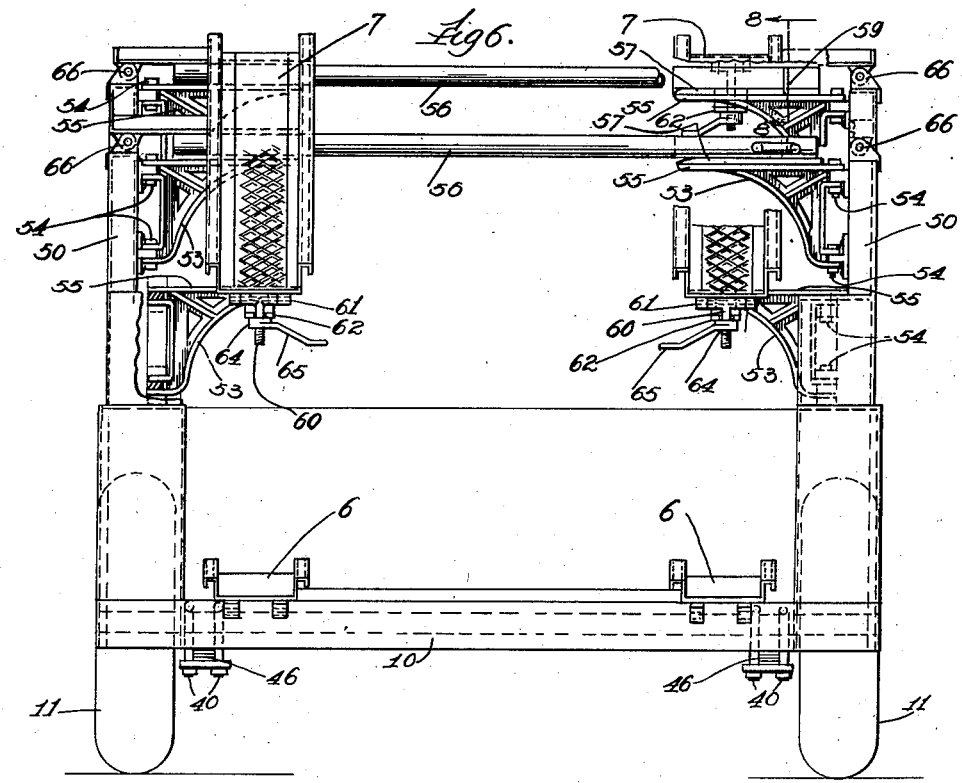
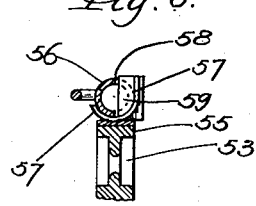
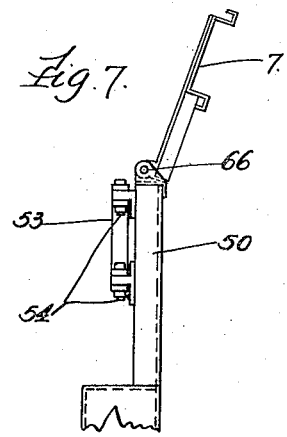
Inventor:
Eugene J. Dondlinger
by his Attorneys Feb. 7, 1939.  E. J. DONDLINGER  2,146,567
TRAILER TRANSPORT VEHICLE
Filed July 11, 1935   5 Sheets-Sheet 5
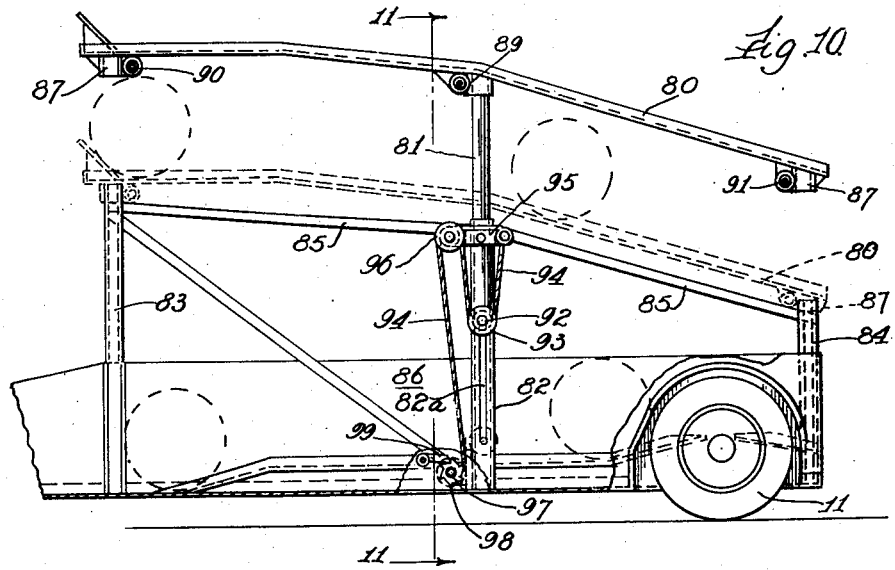
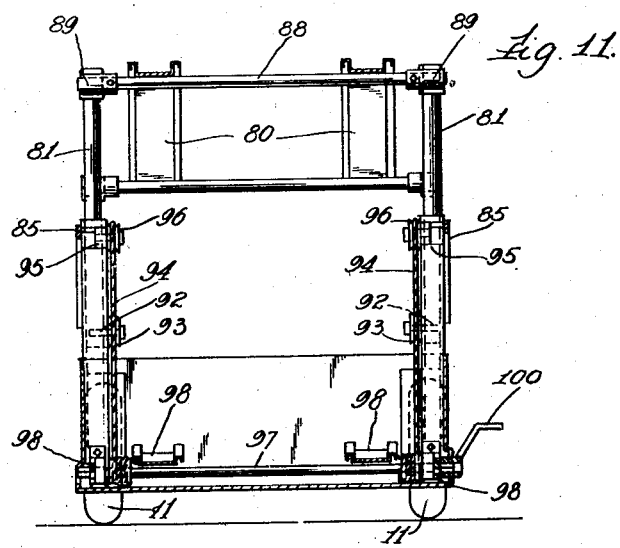
Inventor.
Eugene J. Dondlinger.
by his Attorneys.

Patented Feb. 7, 1939

2,146,567

UNITED STATES PATENT OFFICE 2,146,567

TRAILER TRANSPORT VEHICLE

Eugene J. Dondlinger, Chicago, Ill.

Application July 11, 1935, Serial No. 30,812

4 Claims. (Cl. 296—1)

This invention relates to a vehicle of the type designed for transporting automobiles and motor trucks usually from the factory to the sales branch or dealer. Such a vehicle is usually made as long as possible under existing statutes, and for this reason generally takes the form of a trailer or semi-trailer combined with a suitable tractor truck. As illustrated herein, it is a four-wheel trailer coupled to a four-wheel truck, both vehicles being fitted with suitable run-ways and ramps for supporting automobiles in transit. One object of the invention is to provide a simple and satisfactory connection between the steering axle of the trailer and the trailer frame, together with a drawbar for coupling it to the tractor in a manner to secure accurate steering. Another object is to provide a spring suspension for the trailer vehicle which will accommodate itself to both loaded and unloaded conditions of the vehicle to ensure reasonably smooth riding in both cases. Another object is to arrange certain of the run-ways and their supports so that they may be shifted to provide a clear path for loading vehicles onto other portions of the run-way. Other objects will appear from the following description. The invention thus consists of certain features and elements of construction in combination as herein shown and described and as indicated by the claims.

In the drawings:

Figure 1 is a side elevation of a combined tractor and trailer vehicle embodying this invention.

Figure 2 is a vertical section through the middle of the steering axle of the trailer, taken substantially as indicated at line 2—2 on Figure 3.

Figure 3 is a plan view of the front end portion of the trailer vehicle showing the steering axle and its connection to the trailer frame, with certain parts broken away.

Figure 6 is a rear elevation of the trailer showing the supporting means for the run-ways.

Figure 7 is a detail elevation at the rear of one of the run-ways, showing its hinged connection to the side frame of the trailer.

Figure 8 is a transverse detail section taken as indicated at line 8—8 on Figure 6.

Figure 9 is a transverse detail section taken at line 9—9 on Figure 1.

Figure 10 illustrates a modified form of the trailer, and is mainly in the nature of a longitudinal section taken through the middle of the vehicle, but showing certain parts in side elevation.

Figure 11 is a transverse vertical section taken as indicated at line 11—11 on Figure 10.

Figure 4:
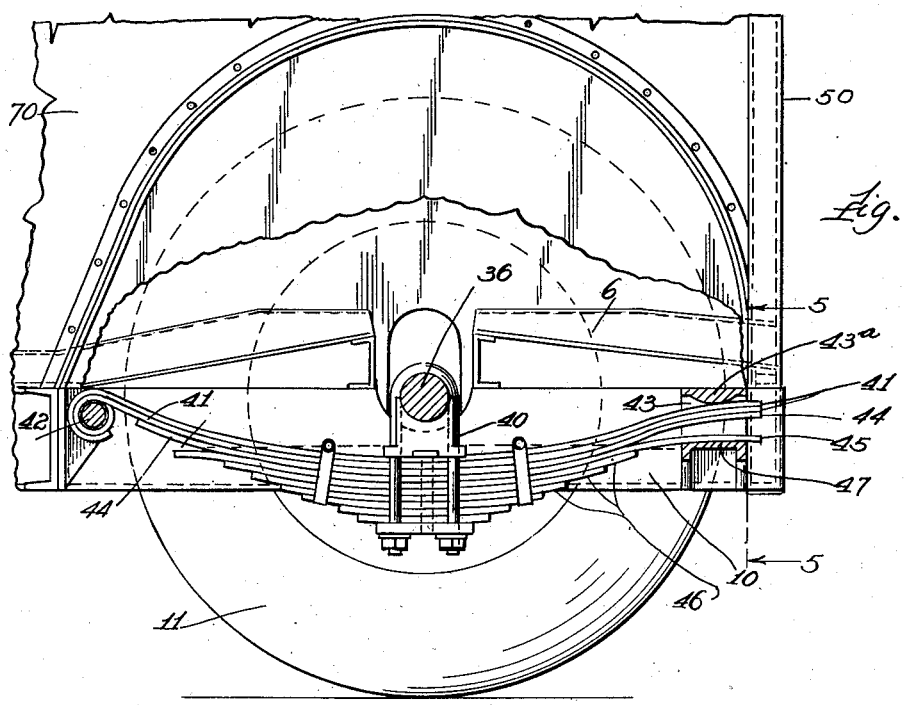
Figure 4 is a vertical sectional view for showing the spring associated with the rear axle of the trailer.
Figure 5:
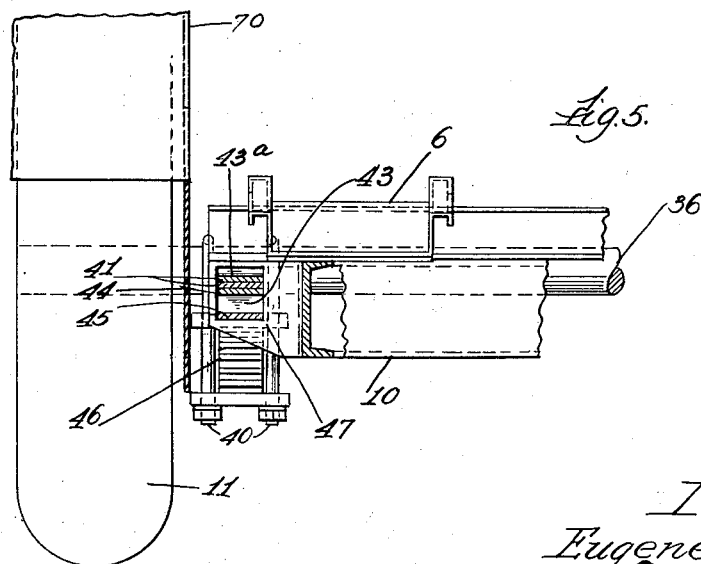
Figure 5 is a section taken as indicated at line 5—5 on Figure 4.

As shown in Figure 1, the tractor-trailer vehicle is designed to accommodate four automobiles; one is carried on a run-way at 1, disposed over the driver's position, and extending adjacent and partially above the driver's cab 2. Another is carried on a run-way 3, which is partly supported by an upwardly and rearwardly bent frame extension 4 secured to the main frame 5 of the tractor vehicle. The trailer vehicle includes a run-way 6 forming a portion of its floor for supporting a third automobile, and a fourth is carried above the third on suitable tracks 7 supported by upwardly extending side frames of the trailer. Figure 1 indicates by dotted outline how the hinged run-way 3 may be swung upwardly to connect with the run-way 1 to form a portion of a ramp for loading a vehicle onto the run-way 1, a temporary inclined ramp 8 being extended through the trailer vehicle for this purpose. When a vehicle is thus driven or drawn over these inclined tracks, it is necessary to provide clearance for the upper portion of such vehicle between the side frames of the trailer; and, consequently, the cross bars 9 and associated brackets which support the upper tracks 7 are made so that they can be swung clear of this path temporarily, and then replaced for supporting the fourth vehicle, which is the last one loaded onto the transport. The details of this arrangement will be described later.

The trailer vehicle is of the four-wheel type, supporting its load independently of the tractor and merely coupled to the latter. At the rear the trailer frame 10 is carried on rear wheels 11, and at the forward end the frame is provided with a rigidly mounted cantilever leaf spring 12, whose flexible end extends forwardly and is formed with an eye 13 which engages a spring bolt 14, shown in Figure 2, just below the axle 15 of the front wheels 16. This front axle 15 may be substantially straight, as shown, and is of the rigid type. The spring volt 14 is carried in a fitting 17 which is rigidly secured by welding to the lower end of the king bolt 18, passing through the axle 15 at the middle of its length to provide a pivotal connection between the axle and the frame for steering of the front wheels 16. At the upper end the king bolt is furnished with a broad bearing disk 19 which may be rigidly secured to the bolt, as by welding, and a suitable wear plate 20 is interposed between this broad head 19 of the bolt and the upper surface of the axle 15. As shown, the axle is made up of an inner tubular portion 21 encased in flat plate or channel sections 22, giving it a rectangular form, and at the middle of its length the whole assembly, including the tube 21, is bored vertically to receive a vertical tube 23 within which a bushing 24 provides a suitable bearing for the king bolt 18.

The load is transmitted from the frame 10 through the spring 12 to the front axle by means of the king bolt and its broad bearing head 19, and to some extent the draft is, of course, transmitted by the spring 12. In addition I provide a draft rod 25 having ball-and-socket connections at 26 and 27 with the frame and with the upper end of the king bolt 18, respectively. The universal connections at the ball-and-socket joints permit the axle 15 to rock transversely to the extent permitted by the flexibility of the spring 12 and frame 10 while, at the same time, there is no looseness in the draft connection between the axle 15 and the frame 10. This ensures accurate steering of the trailer so that it will track properly behind the truck. Accurate steering is further ensured by the arrangement of the triangular drawbar 28 which, as seen in Figure 3, is connected by horizontal pivots 29 to the axle 15 at widely separated points adjacent the wheels 16. The drawbar terminates at its forward end in an eye 30, dimensioned to engage a standard pintle hook 31, seen in Figure 1, secured to the rear of the truck frame 5.

Since the front wheels 16 swing through a relatively wide arc in the steering movement, I prefer to mount the "mud guards" or fenders 32 on the axle 15, so that their position relative to the wheels will be fixed. For this purpose an anchorage in the form of a plate 33 is secured to each end of the axle, and the curved fender 32 is supported by three arms 34, each made of flat spring stock, bolted to the plate 33 at the inner end and bent at right angles at the outer end for securement against the inner surface of the fender 32. Preferably, the inner end of each arm is composed of three thicknesses or leaves, the longest one being secured between two shorter ones 34a, and the long leaf being twisted through substantially 180 degrees, as seen at 35. I find that this eliminates the otherwise serious vibration which would tend to loosen the fastenings, because the fender is mounted directly to an unsprung element, the axle 15.

Referring to Figure 4, which shows one of the rear wheels 11 and the rear axle 36, it will be seen that the frame 10 is supported on the axle by means of semi-elliptic leaf springs, one of which appears in this view. The extreme outer end portions of the spring are engaged with the frame 10 while the middle portion is secured to the axle by means of U-bolts 40. As shown, the two upper leaves 41, which are the longest leaves of the spring, are formed with an eye at one end for engagement with the spring bolt 42 which anchors this end of the spring to the frame 10. At the other end these leaves 41, and the next adjacent leaf, extend into a pocket 43 formed with a convex bearing pad 43a on its upper wall. The leaves 41 and the next adjacent leaf 44 are formed so as to be normally in contact with each other throughout their length, but when the spring is under light load the end portions of the leaf 44 are separated from the end portions of the next leaf 45, as seen in Figure 4. The remaining leaves 46 are designed to contact throughout their entire length at all times. Thus when the trailer is fully loaded, the upper leaves 41 and 44 will bear down into full contact with the leaf 45, and the entire spring will be brought into play for supporting the heavy load; but when the trailer is running light, as on the return trip after delivering a consignment of automobiles, the weight will be carried on the outer ends of the three upper leaves which will be flexed upwardly out of contact with the end portions of the leaf 45. The middle portions of the leaves 46 at such a time will act more as a mere block to transmit the load to the U-bolts 40, and thence to the axle 36. This arrangement will make the trailer ride easier when empty, because of the relatively long unsupported end portions of the upper leaves which carry the load. Preferably, one end of the leaf 45 is extended to project into the pocket 43, and because of the divergence between the leaves 44 and 45, the latter will bear resiliently against the lower wall 47 of the pocket, and thus prevent slap of the spring end in the pocket in traveling a bumpy road.

Figure 6 shows the trailer as viewed from the rear with lower run-ways or tracks 6 and the upper run-ways 7. The side frames of the trailer body include upright members 50 at the extreme rear, and similar uprights differing in length at 51 and 52. At each of these points the uprights are provided with brackets 53 hinged on the vertical pivots 54 so that they may be swung for extending their horizontal arms 55 transversely of the vehicle in pairs extending toward each other. When thus extended two pairs of brackets support tubular cross-bars 56. Preferably, these cross-bars are secured permanently, as by riveting or welding to the brackets at one side of the vehicle, and the brackets at the opposite side are each provided with a curved receiving cradle 57 in which the extending end of the round bar 56 is lodged. A vertical slot 58, near the end of the bar, engages with a key 59, secured in the cradle 57, to hold the bar 56 rigidly against endwise movement, thus tying together the two side frames of the vehicle and definitely spacing the track or run-way members 7, 7.

These tracks 7, 7 are themselves removably lodged on the cross-bars 56 just above the horizontal arms 55 of the brackets, and are held down by screw clamping devices, as seen in Figure 6. Each clamp comprises a T-bolt 60 whose cross bar is swung in bearing clips 61 secured to the under-side of the track member 7. A bifurcated plate 62 is attached to the under side of the bracket arm 55 so as to receive in its slot the stem of the T-bolt with its clamping nut 64 below the plate 62. The nut may be formed with a convenient handle 65 so that it can be quickly turned into clamping position or released therefrom when desired. Whenever a clear path through the trailer is required for loading vehicles onto the tractor ahead, these clamps are released, and the T-bolts swung out of engagement with the slotted plates 62. This permits the track members 7 to be folded outwardly about their hinge pivots 66, by which they are attached to the uprights or to some other part of the side frame, and when the tracks are thus clear of the brackets, the cross members 56 will be disengaged from the brackets at one end and swung about 90 degrees adjacent the plane of the side frame to which they are attached. The brackets 53, from which the cross-bars are thus disengaged, will also be swung 90 degrees adjacent the plane of their side frame. The two brackets 53 on the rear uprights 50 support the rear ends of the tracks 7 directly, and are not connected by a cross-bar, although they include the hold-down clamps with T-bolts 60, as already described. When the clamps are released, and the tracks 7 are swung outwardly, these brackets also are swung toward the planes of their respective side frames, thus leaving the middle portion of the trailer clear for the passage of the vehicles over the temporary ramp 8 or onto the lower tracks 6.

As seen in Figure 1, the trailer vehicle is provided with a sheet metal side wall 70. Necessarily, the tread of the rear wheels 11 of the trailer is greater than the tread of the automobiles which are driven between these wheels in loading the transport; consequently, the width of the trailer vehicle is greater than the width of the motor truck, which is of standard construction in this respect. The tread of the front wheels 16 of the trailer may also be standard. Therefore, the side wall 70 slants inwardly at 71 to narrow the extreme forward end of the trailer to approximately standard width, and so that if the transport should side-swipe another vehicle on the road, the slanting portion 71 will act cam-wise to strike a glancing blow which will be less likely to cause serious damage than if the front ends of the trailer projected bluntly beyond the width of the tractor. In addition to the side wall 70 there is shown a rub rail 72, formed of sheet metal folded with a vertical flange 73, extending upwardly and secured under the lower edge of the side wall 70. From this flange the rail is made with an offset 74 to carry its guard or contact surface 72 beyond the plane of the side wall 70 into a parallel plane. At the lower edge a horizontal flange 75 extends under the end of the frame member to which the rail is attached.

Instead of mounting the upper tracks or runways on hinges, as already described, these tracks may be arranged to be lifted bodily to provide clearance for driving in the cars which are to occupy the tracks on the tractor vehicle and the lower position on the trailer. As shown in Figure 10 the upper run-ways 80 are carried by uprights 81 telescopically mounted in the posts 82 at about the middle of the length of the runways. The posts 82 are connected with end posts 83 and 84 by frame members 85 and side panels 86, and adjacent their ends the tracks 80 are provided with sockets 87 designed to fit over the ends of the posts 83 and 84 when the run-way is in its lower position indicated in dotted outline.

Figure 11 shows the transverse connection between the posts 81 as consisting of a tubular cross-bar 88 secured in fittings 89, each mounted on the upper end of one of the posts 81. The tracks 80 are permanently attached to this cross-bar 88, and adjacent their ends are similarly connected by cross-bars 90 and 91, which may be secured to the fittings which include the sockets 87. The run-way, composed of tracks 80, 80, is thus rendered a unitary structure which can be raised and lowered at will to afford clearance for moving cars under it.

At the lower end of each post 81 there is secured a cross-pin 92 carrying a pulley 93. A cable 94 is anchored to a fitting 95 at the upper end of the post 82 and, passing around the pulley 93, extends upwardly and over a pulley 96, which is also supported on the fitting 95. Thence, the cable 94 runs to a windlass on a shaft 97 extending across the vehicle under the tracks 98. In this way the cables 94, associated with the two telescoping posts 81, are operated in unison for raising or lowering the posts. The cross-pin 92 extends through a slot 82ᵃ in the post 82, permitting its vertical travel therein. The shaft 97 may be provided with a ratchet wheel 98 and detent dog 99 for holding the tracks 80 at elevated position, and the end of the shaft 97 may be squared to receive a removable winding crank 100, as shown in Figure 11. It will be understood that the mechanism described is not intended for raising the tracks 80 with a vehicle lodged thereon, but only when they are empty, as in the process of loading or unloading, either before the last car has been placed in position on these tracks or after it has been removed as the first to be unloaded from the transport vehicle.

I claim:

1. In a vehicle of the class described, a pair of side frames with a run-way between them, a second run-way composed of two parallel track members, a support for each track member, said supports being disposed substantially in the respective vertical planes of the side frames and each being composed of two sections one slidable vertically upon the other, said slidable sections of the uprights being secured to said track members respectively, together with means for raising and lowering said slidable sections simultaneously at will, inter-membering features on the track members and side frames respectively at points remote from the slidable supporting sections engageable when the run-way is disposed at its lower limit and separable upon elevation of the run-way, and transversely extending cross-members connecting the track members of the second run-way adjacent said inter-membering features for steadying the run-way and bracing the side frames when the run-way is engaged therewith at its lower limit.

2. In a vehicle of the class described, a pair of side frames with a lower runway between them, an upper runway disposed over the lower one and including two parallel track members, a pair of supports for said upper runway secured to the side frames respectively substantially in the vertical planes thereof, each support being composed of two sections telescopically engaged to render one section slidable vertically upon the other, said slidable sections of the uprights being secured to said upper runway, together with means for raising and lowering said slidable sections simultaneously at will, and a transversely extending cross-bar rigidly connecting said slidable supporting sections adjacent the track members and thus serving as cross-bracing for the side frames of the vehicle, the spaces between said supports being unobstructed from the lower runway to said cross-bar.

3. In a vehicle of the class described, a pair of side frames with a lower runway between them, an upper runway disposed over the lower one and including two parallel track members, a pair of supports for said upper runway disposed substantially in the respective vertical planes of the side frames and each composed of two sections, one slidable vertically upon the other, said slidable sections of the uprights being secured to said upper runway, means for raising and lowering said slidable sections simultaneously at will, and end posts for the side frames respectively, the spaces between said end posts being transversely unobstructed, and transversely extending cross-members connecting the track members of the upper runway adjacent the end posts, together with downwardly open sockets rigidly secured to said cross-members disposed to engage the end posts for steadying the said runway and bracing the side frames when said runway is disposed at its lower limit.

4. In a vehicle of the class described, a pair of side frames with a lower runway between them, an upper runway disposed over the lower one and including two parallel track members, a pair of supports for said upper runway each comprising a tubular section secured to the side frame and substantially in the vertical plane thereof and a section slidably guided in said tubular member for vertical movement, the slidable sections being secured to said upper runway, means for raising and lowering said slidable sections simultaneously at will, cross-bars connecting the track members adjacent said supports and also at the ends of the runway remote from said supports and fittings rigidly secured to said cross-bars including downwardly open sockets, one pair of sockets being rigidly secured to the slidable sections of the supports, said side frames having end posts, and the other sockets being engageable respectively with said end posts for steadying the runway and causing the cross-members to serve as cross-bracing when the upper runway is disposed at its lower limit.

EUGENE J. DONDLINGER.